United States Patent [19]

Wang et al.

[11] Patent Number: 4,920,161

[45] Date of Patent: Apr. 24, 1990

[54] HIGH STRENGTH EPOXY TOOLING COMPOSITIONS

[75] Inventors: Chen-Shih Wang, Troy; Richard P. Atkins, Utica; Elio Eusebi; Thomas J. Dearlove, both of Troy, all of Mich.

[73] Assignee: General Motors Corporation, Detroit, Mich.

[21] Appl. No.: 243,888

[22] Filed: Jun. 24, 1988

[51] Int. Cl.$^5$ .......................... C08L 63/02; C08K 7/00
[52] U.S. Cl. ..................................... 523/220; 523/440; 523/443
[58] Field of Search ............ 523/220, 440, 443

[56] References Cited

U.S. PATENT DOCUMENTS

| | | | |
|---|---|---|---|
| 4,423,094 | 12/1983 | Dearlove et al. | 528/94 |
| 4,423,904 | 12/1983 | Dearlove et al. | 528/94 |
| 4,550,127 | 10/1985 | Renker | 523/220 |
| 4,552,993 | 11/1985 | Sellstrom et al. | 524/590 |
| 4,732,962 | 3/1988 | Atkins et al. | 523/443 |

*Primary Examiner*—Lewis T. Jacobs
*Attorney, Agent, or Firm*—Randy W. Tung

[57] ABSTRACT

A high strength, room temperature curable epoxy tooling compositions containing interstitially-matched filler systems for making cast-to-size forming tools for metal sheet stamping. The composition can be fully cured by at least one aliphatic amine catalyst in twelve hours producing a rigid article having a tensile strength of at least 40 MPa and a compressive strength of at least 100 MPa.

5 Claims, No Drawings

HIGH STRENGTH EPOXY TOOLING COMPOSITIONS

FIELD OF THE INVENTION

The present invention generally relates to a high strength, room temperature fast curing epoxy tooling composition for mass-cast and cast-to-size forming tools used in metal sheet stamping and, more particularly, it is concerned with a high strength, room temperature curable epoxy tooling composition for making mass-cast and cast-to-size forming tools for metal sheet stamping which can be fully cured by an aliphatic amine catalyst in twelve hours.

BACKGROUND OF THE INVENTION

Forming dies for stamping sheet metal parts have been traditionally made of high strength tool steel because of its rigidity and durability. In the automotive industry, forming dies made of tool steel have been used to stamp out automobile body parts from steel sheets. However, this type of stamping dies is very expensive to make due to the extensive machining required to make them.

It is a common practice in the automotive industry that before a new vehicle having a new body style is put in production, a limited number of concept cars or prototype vehicles is first built for testing. Designing forming tools with tool steel for stamping sheet metal parts used in these prototype vehicles would not be practical for several reasons. First, a prototype vehicle has to be built in a relatively short time which prohibits the use of tool steel for stamping dies due to the extensive machining required. Secondly, the design of a prototype vehicle is frequently changed many times from its original design before it reaches a final production model. This means that many stamping dies would have to be built before the design of a sheet metal part is finalized thus making the building of stamping dies with tool steel prohibitive for cost reasons.

A method of making prototype stamping tools is by using a zinc alloy material called Kirksite. Even though a Kirksite tool is more economical to make because of the lower cost of the material, a Kirksite tool still requires the use of a foundry as well as extensive machining to obtain the desired contour and close match between the tool halves. Furthermore, a Kirksite tool is extremely heavy and very difficult to handle.

In recent years, there has been a renewed effort to develop mass castable polymeric materials to make durable sheet metal forming tools. One of these commonly used materials is epoxy.

It is well known in the art that it is extremely difficult to formulate a mass castable, room temperature fast curing epoxy that can be cast-to-size into high strength tools. by mass castable, we mean the pouring of a liquid epoxy composition in one casting step to produce a completed portion of a tool. By cast-to-size, we mean a process in which the exact contour is obtained on the surface of a tool such that no machining, barbering, or spotting on the tool surface is required.

For instance, U.S. Pat. No. 4,423,094 to Dearlove et al disclosed a tough, durable bisphenol A epoxy composition for use in making sheet metal stamping dies. While this material exhibits good mechanical strength, it does not form a durable punch for stamping tools. Moreover, it requires an extensive curing procedure, i.e. it must be hardened at room temperature overnight and then post-cured at 150° C. for two hours. Since most stamping tools for automobile body panels are large in size and weight, it is preferable to make dies that need no elevated temperature curing.

Others have used room temperature curable epoxy resin systems such as those based on bisphenol A and an aromatic amine catalyst to make plastic tools. An extensive curing period between 4 days to 1 week is required for this type of room temperature curable epoxy composition. To achieve rapid cure, i.e., to cure in less than 24 hours, an aliphatic amine catalyst instead of an aromatic amine catalyst must be used in an epoxy molding composition. This type of rapid curing epoxy system has been used in adhesives and coatings where the maximum thickness of the epoxy layer is no more than ¼ inch thick.

Attempts to use this type of rapid curing epoxy composition in bulk casting epoxy tools have met no success. The major problems encountered in casting a bulk section epoxy tooling with a rapid curing epoxy composition are severe shrinkage and dimensional distortion which leads to unacceptable warpage of the tool. These problems are caused by the extreme heat generated by the exothermic curing process. Since the curing process proceeds very rapidly, the amount of exothermic heat cumulated in a bulk section epoxy tooling cannot be rapidly dissipated by heat transfer due to the low thermal conductivity of epoxy. This large amount of exothermic heat causes the formation of localized heat pockets and thermal shocks which lead to shrinkage, cracking, and dimensional distortions. Therefore, no one skilled in the art has been able to use the combination of bisphenol A epoxy resin and aliphatic amine catalysts in making high strength epoxy tools that are mass-cast, cast-to-size, and fast cured.

When a material is selected for building stamping tools, both its compressive strength and its tensile strength are important considerations. To sustain a high compressive load in the vertical direction, a tooling material must have high compressive strength. Similarly, to sustain a high tensile load in the horizontal direction, a tooling material must also have high tensile strength. This type of tensile load, for example, is frequently seen in the cavity of a stamping tool having a V-shaped concave configuration in the tool surface. Most commercially available epoxy tooling materials do not have the necessary combination of compressive strength and tensile strength for making stamping tools.

For instance, we have tested one of the widely used mass-castable epoxy tooling materials, Magnolia 6012, and found it has a tensile strength of 35.7 MPa, a compressive strength of 74.0 MPa, and a flexural strength of 62.7 MPa. It requires an extensive length of time, i.e. 4 days, to cure while producing a 3% volume shrinkage. We have learned from our experience using this material that, for some complex tools with the V-shaped concave configuration, its mechanical properties were unacceptable. It is believed that the tooling material should have a minimum tensile strength of 40 MPa and a minimum compressive strength of 100 MPa.

It is therefore an object of the present invention to provide a mass-cast epoxy tooling composition that has high compressive strength and high tensile strength sufficient for making durable stamping tools.

It is another object of the present invention to provide an epoxy tooling composition that can be rapidly cured at room temperature in less than 24 hours without dimensional distortion.

It is yet another object of the present invention to provide an epoxy tooling composition that can be rapidly cured at room temperature in less than 24 hours to make a cast-to-size metal sheet forming die having optimum dimensional stability.

It is a further object of the present invention to provide an epoxy tooling composition that can be rapidly cured at room temperature in less than 24 hours into a dimensionally stable sheet metal forming tool having high strength and durability.

SUMMARY OF THE INVENTION

In accordance with a preferred practice of our invention, a high tensile and compressive strength epoxy tooling composition that can be rapidly cured at room temperature in 12 hours and be used in casting a durable epoxy tool having bulk sections is provided. The term "rapid curing" as used here is defined as a curing process that can be completed in a period of time of less than 24 hours. This is significantly shorter than a conventional room temperature curable epoxy composition which requires a curing time between 96 hours to 168 hours for a complete cure. The term "bulk sections in an epoxy tooling" is defined as an epoxy tool having thick and thin sections generally in a dimension much larger than ¼ inch. For instance, in a typical epoxy stamping tool for automotive body panel parts, the dimensions of the tool are as large as 3 ft×5 ft and 1½ ft deep.

We have discovered that in order to use a room temperature rapid curing epoxy composition in casting a bulk section tool, the reaction exothermic heat given out by the epoxy system during curing must be controlled. Since the amount of exothermic heat per unit weight of fast curing epoxy is fixed, our novel invention solves the localized over-heating problem in two ways. First, to minimize the total amount of exothermic heat produced by the epoxy curing reaction. This was carried out by properly selecting a combination of epoxy resins and catalysts for minimal reaction exotherms and optimal curing cycles.

The second way to solve this problem is to use the least amount of epoxy possible in the casting composition by utilizing a novel system of interstitially-matched fillers. Other workers have attempted to use a large amount of fillers in a rapid cure epoxy system without success. For instance, when loadings above a critical level of a certain particle size filler are added to an epoxy casting composition, the viscosity of the composition increases to such an extent that epoxy loses its fluidity necessary to fill the tool. This phenomenon occurs even when fillers of different particle sizes are used in a composition when the filler particle size is not interstitially matched.

We discovered that by interstitially matching the particle sizes of the fillers, the viscosity of the filled epoxy composition could be maintained at an almost constant level even at very high filler loadings. By interstitially matching the filler system, we carefully selected fillers having different particle sizes such that smaller particles fit in the interstices between larger particles. We have discovered that the smaller fillers should have a particle size that is 6 to 10 times smaller than that of the next size larger fillers in order for them to be interstitially matched. For instance, in a filler system containing three different sizes of fillers, the smaller filler has an average diameter that is 6 to 10 times smaller than the medium size filler while the medium size filler has an average diameter that is 6 to 10 times smaller than the larger size filler. These ratios shall be illustrated by the size of the filler samples disclosed in a latter part of this specification. This critical requirement must be met so that a total filler loading level of up to 75 volume percent may be used while maintaining the fluidity of the epoxy casting composition.

We also discovered that, in using a room temperature rapid curing epoxy composition in bulk casting an epoxy tooling, that a high loading of a filler system must be used in such a way that it serves as a heat buffer system absorbing the exothermic heat evolved from the curing reaction. This heat buffer system when suitably distributed in the epoxy composition absorbs the exothermic heat such that the formation of thermal shocks or localized heat pockets and the resulting shrinkage or deformation of the epoxy tool may be avoided.

When these two requirements are met, optimum casting properties of our epoxy tooling composition were realized. However, for such a highly filled epoxy composition, it is well known that it could be difficult to obtain high mechanical strength especially the property of tensile strength. Nevertheless, for our unique epoxy tooling composition when prepared by the aforementioned technique, we found that it can be used to build durable stamping tools with significantly improved mechanical strength of at least 40 MPa in tensile strength and at least 100 MPa in compressive strength.

Our novel invention comprises a bisphenol A type epoxy resin, an aliphatic amine catalyst, and an interstitially-matched filler system. The interstitially-matched filler system used in our preferred embodiment consists of silicon carbide and silicon oxide fillers of specific particle sizes. When used in an amount of 51 volume percent of the total epoxy composition, this filler system significantly reduces the total exothermic heat evolved from the curing reaction of the epoxy. Our novel epoxy casting composition can be cast into a bulk epoxy forming tool and cured at room temperature in less than 12 hours.

Other objects, features and advantages of the present invention will become apparent upon consideration of the specification that follows.

DESCRIPTION OF PREFERRED EMBODIMENTS

The concept of using an interstitially-matched filler system in which the smaller particulate fillers fit in the interstitial spacings left by the larger and medium size particulate fillers was first proven by using a commercial epoxy system. This commercial epoxy system Magnolia 6013A was obtained from the Magnolia Plastics Co. It contains 27 volume percent iron particles of 20 micron size. To test the workability of our interstitially-matched filler system, we first added a second filler of 125 micron size iron particles to observe its effect on viscosity. A drastic increase in viscosity from $70 \times 10^3$ centipoise at 25 volume percent total iron particle loading to $470 \times 10^3$ centipoise at a total iron particle loading of 33 volume percent was observed, i.e., a seven-fold increase in viscosity by a small 8 volume percent increase in the iron powder loading. Our tool making experience indicates that when a viscosity of greater than $150 \times 10^3$ centipoise is reached, the fluidity of the casting composition is reduced to such an extent that the composition becomes virtually unpourable.

We next tried our interstitially-matched filler system by using an iron particle having particle size of 279 microns. By gradually increasing the total iron powder loading to 40 volume percent, the viscosity of the system is increased only from $70 \times 10^3$ to $100 \times 10^3$ centipoise. At $100 \times 10^3$ centipoise viscosity, the casting composition can be poured into mold sections having intricate shapes with no flow problem. We have therefore proven that our interstitially-matched filler systems give a low viscosity fluid with high filler loading for the desired castability.

The epoxy resin used in our novel invention is a diglycidyl ether of bisphenol A supplied by the Ciba-Geigy Co. under the tradename of Araldite 6005. This epoxy resin has an approximate epoxy equivalent weight of about 180 to 196 and a viscosity at 25° C. in the range of about 7500 to 9500 centipoise. Other commercial products that are substantially equal to this epoxy compound are Dow Chemical DER 330 resin, Interez Epi-Rez 509, and Shell Epon 826.

To achieve the fast curing reaction of our epoxy casting compound, an aliphatic amine, polyoxypropylenetriamine, is used as the catalyst. This aliphatic amine is supplied by the Texaco Chemical Co. under the tradename of Jeffamine T-403. It is a trifunctional primary amine having an average molecular weight of approximately 440. Its amine groups are located on the secondary carbon atoms at the ends of aliphatic polyether chains.

The formulations of our novel epoxy composition are shown in the following examples.

EXAMPLE 1

| Composition | Weight Percent |
| --- | --- |
| Araldite ® 6005 | 18.7 |
| Jeffamine ® T-403 | 8.4 |
| SiC 100 | 43.3 |
| SiC 800 | 16.5 |
| SiO2 A25E | 13.1 |
|  | 100.0 |
| Properties | MPa |
| Tensile Strength | 59.5 |
| Compressive Strength | 130.1 |
| Flexural Strength | 92.4 |

The interstitially-matched filler system used in Example 1 comprises two silicon carbide fillers and one silicon oxide filler. The silicon carbide fillers were selected for their superior abrasion resistance resulting in a forming tool having superior durability. The silicon oxide filler was selected for its rigidity and low cost. Two different particle sized silicon carbides were used. They were obtained from the Sohio company. Silicon carbide SiC 100 has particle sizes in the range between 63 to 203 microns with an average particle size of 122 microns. SiC 800 has particle sizes in the range between 5 to 30 microns with an average particle size of 12 microns. A fine particle size silicon oxide A25E from Illinois Minerals Co. was selected to fit in between the larger SiC particles. $SiO_2$ A25E has particle sizes in the range between 0.5 to 20 microns with an average particle size of 2 microns. The ratios on the particle sizes are therefore between 6 to 10 times, i.e., $122:12 = 10$ and $12:2 = 6$. These ratios are desirable such that the filler particles may be interstitially matched.

To compound our novel epoxy formulation, suitable amounts of liquid epoxy and liquid catalyst are weighed and poured into a stainless steel bowl of a Ross mixer. The particulate fillers are then added to the stainless steel bowl. The total ingredients are mixed by a motor driven mixing blade under 30 inches of vacuum for 1 hour. The vacuum was applied to degas any air bubbles generated during the mixing process. The mixed epoxy formulation has a shelf life of approximately 4 hours.

The composition given in Example 1 has been tested by casting many sheet metal stamping tools, including a 3.5 ft × 1.8 ft × 1.5 ft automotive underhood body part tool. The two halves of this tool were cured in 10 hours at room temperature and were cast-to-size with no machining required. The tool was successfully used to stamp 250 prototype steel (0.035 inch thick) parts.

EXAMPLE 2

| Composition | Weight Percent |
| --- | --- |
| Araldite ® 6005 | 17.3 |
| Jeffamine ® T-403 | 5.7 |
| Jeffamine ® D-400 | 2.4 |
| SiC 100 & 400 | 61.2 |
| SiO2 A25E | 13.3 |
|  | 100.0 |
| Properties | MPa |
| Tensile Strength | 60.7 |
| Compressive Strength | 133.4 |
| Flexural Strength | 95.6 |

The silicon carbide 400 filler used in Example 2 has particle sizes in the range between 11 to 45 microns with an average particle size of 22 microns.

Other ingredients used in Example 2 are the same as those used in Example 1 except that a mixture of two aliphatic amine catalysts is used. By using this combination of catalysts, and a slightly higher filler loading, we were able to obtain an epoxy tooling composition more suitable for casting very large (8 ft × 6 ft × 4 ft) and complex stamping tools, such as for automotive doors, decklids, fenders, and floor tunnels. The casting accuracy or the linear shrinkage of all our epoxy formulations was found to be 0.002% or less.

The mixing procedure used to prepare this composition is the same as that in Example 1.

EXAMPLE 3

| Composition | Weight Percent |
| --- | --- |
| Araldite ® 6005 | 18.6 |
| Jeffamine ® T-403 | 6.1 |
| Jeffamine ® D-400 | 2.6 |
| SiO2 85, 23 & A25E | 72.7 |
|  | 100.0 |
| Properties | MPa |
| Tensile Strength | 49.1 |
| Compressive Strength | 122.8 |
| Flexural Strength | 82.6 |

The particle size distribution of our interstitially-matched silicon oxide filler system used in Example 3 is very similar to those used in the previous two examples. The composition is suitable for casting small-to-medium-sized metal stamping tools at very low cost. A number of automotive prototype parts, such as roll bars and floor brackets, have been successfully fabricated from tools cast from this composition.

The procedure for casting an epoxy forming tool for metal sheet stamping process is adequately described in U.S. Pat. No. 4,601,867. When casting a large size forming tool, other physical reinforcement such as rocks and steel wire mesh are also used to improve structural integrity.

Our novel epoxy casting compositions can be fully cured at room temperature in a period of time between 8 to 12 hours when cast as a sheet metal stamping tool of various sizes. This fast curing composition is a significant improvement over other room temperature curable epoxy systems which normally require a cure time between 4 days to 7 days. Our novel interstitially-matched filler system enables the use of an aliphatic amine catalyst which promotes very fast curing. It also enables the use of a minimal amount of epoxy resin by using a high loading of the filler system while maintaining the fluidity of the epoxy composition. This novel epoxy formulation enables the use of a fast cure epoxy resin in casting a bulk forming tool which was never successful before by others skilled in the art.

We are able to control the exothermic heat generated by the rapid reaction of epoxy and Jeffamine ® by incorporating an exceptionally large amount of fillers into our tooling compositions. This prevents a so-called "thermal runaway" problem frequently seen in casting bulk epoxy toolings.

We have also discovered that contrary to the general observations that particulate fillers cause degradation in tensile properties in epoxy resins, our highly filled compositions have substantially higher tensile strengths than those disclosed by Dearlove and Magnolia Plastics. This comparison is shown in the following table:

| Composition | Vol % Filler | Tensile Strength (MPa) |
|---|---|---|
| Example 1 | 51 | 59.5 |
| Dearlove PTM130 | 32 | 33.1 |
| Dearlove PTM140 | 30 | 33.0 |
| Magnolia 6012 | 27 | 35.7 |

The high tensile strength achieved by Example 1 was quite unexpected. We have found that high tensile strength contributes greatly to the durability of a stamping tool since it prevents cracking or splitting of a tool having a concave surface configuration.

We have also devised an alternate mixing procedure to use this epoxy casting composition beyond the laboratory stage. In a production setup, the interstitially-matched filler system containing several different particle size fillers would be pre-mixed in large quantities. To achieve optimum processability, 85 weight percent of this pre-mixed filler is blended with the epoxy resin forming part A of the total formulation. The remaining 15 weight percent of the pre-mixed filler is then blended with the liquid catalyst forming part B of the total formulation. The part A and part B liquid filler blends in a slurry form can then be kept indefinitely in a cool place. When a forming tool is to be cast, suitable amounts of part A and part B are metered and mixed together and poured into a casting mold.

While our invention has been described in terms of one specific embodiment thereof, other forms could be readily adopted by one skilled in the art to achieve the same results. For instance, any combination of other suitable filler particles having suitable particle sizes may be combined to form our interstitially-matched filler system. The only critical requirement to be met is that they must be interstitially-matched such that even when used at a high volume percent they do not significantly increase the viscosity of the total blended epoxy system. Other metal or metal oxide filler particles having good rigidity and abrasion resistance may suitably be used in place of silicon carbide or silicon oxide.

The embodiments of the invention in which an exclusive property or privilege is claimed are defined as follows:

1. A high strength, low shrinkage, room temperature curable epoxy tooling composition for use in cast-to-size forming tools for metal sheets comprising a bisphenol A epoxy, a polyoxypropylene amine catalyst, and a filler system containing no less than three different sized particulate fillers of which the average size of the smaller filler is about six to ten times smaller than the average size of the next size larger filler, said composition being fully curable into a rigid article having a tensile strength of at least 40 MPa and a compressive strength of at least 100 MPa.

2. A high strength, low shrinkage room temperature curable epoxy tooling composition for use in cast-to-size forming tools for metal sheets comprising 10 to 20 weight percent of a bisphenol A epoxy, 6 to 12 weight percent of at least one polyoxypropylene amine catalyst, and 50 to 85 weight percent of a filler system containing no less than three different sized particulate fillers of which the average size of the smaller filler is about six to ten times smaller than the average size of the next size larger filler, said composition being fully curable in less than twenty-four hours producing a rigid article having a tensile strength of at least 40 MPa and a compressive strength of at least 100 MPa.

3. A high strength, low shrinkage, room temperature curable epoxy tooling composition for use in cast-to-size forming tools for metal sheets comprising 10 to 20 weight percent of a diglycidyl ether of bisphenol A having a room temperature viscosity between 7500 to 9500 centipoise, 6 to 12 weight percent of at least one polyoxypropylene amine catalyst, and 50 to 85 weight percent of a filler system containing no less than three different sized particulate fillers of which the average size of the smaller filler is about six to ten times smaller than the average size of the next size larger filler, said composition being fully curable into a rigid article having a tensile strength of at least 40 MPa and a compressive strength of at least 100 MPa.

4. A high strength, low shrinkage room temperature curable epoxy tooling composition for use in cast-to-size forming tools for metal sheets comprising 10 to 20 weight percent of a bisphenol A epoxy, 6 to 12 weight percent of at least one polyoxypropylene amine catalyst, and 50 to 85 weight percent of a filler system containing no less than three different sized particulate fillers of which the average size of the smaller filler is about six to ten times smaller than the average size of the next size larger filler, said composition being fully curable in less than twenty-four hours producing a rigid article having a linear shrinkage of no more than 0.002 percent.

5. A high strength, room temperature cured cast-to-size epoxy tool for metal sheet stamping which is a reaction product of 10 to 20 weight percent of a bisphenol A epoxy resin, 6 to 12 weight percent of at least one polyoxypropylene amine catalyst, and 50 to 85 weight percent of a filler system containing no less than three different sized particulate fillers of which the average size of the smaller filler is about six to ten times smaller than the average size of the next size larger filler, said epoxy tool after fully cured in less than twenty-four hours having a tensile strength of at least 40 MPa and a compressive strength of at least 100 MPa.

* * * * *